June 3, 1952     C. F. SCHAEFER     2,599,288
TRUE AIR-SPEED METER
Filed Jan. 17, 1947
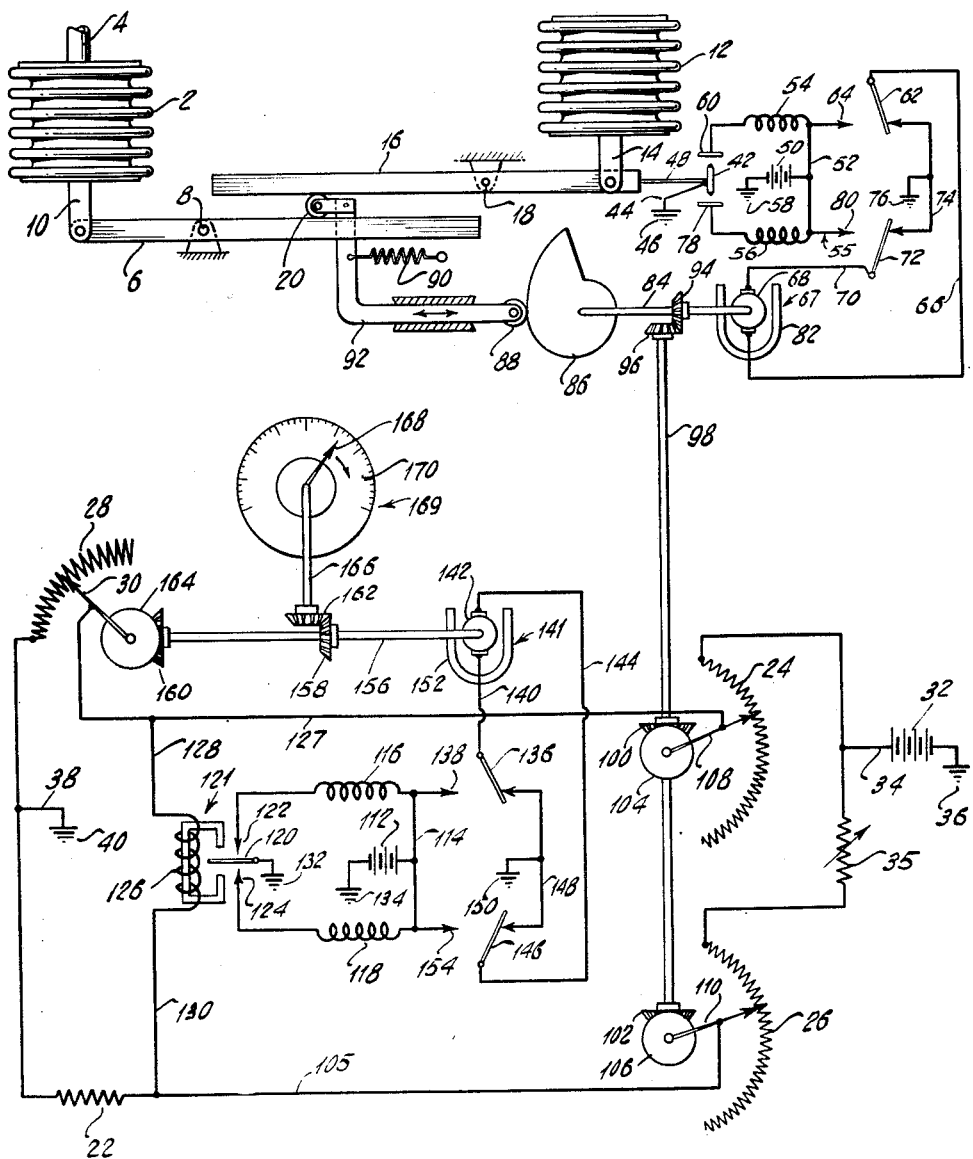
INVENTOR.
Carl F. Schaefer
BY Henry L. Shenier
ATTORNEY.

Patented June 3, 1952

2,599,288

UNITED STATES PATENT OFFICE 2,599,288

TRUE AIR-SPEED METER

Carl F. Schaefer, Port Washington, N. Y., assignor to The Norden Laboratories Corporation, New York, N. Y., a corporation of Connecticut Application January 17, 1947, Serial No. 722,652

10 Claims. (Cl. 73—182)

My invention relates to true air speed meters, and more particularly to a device capable of ascertaining the true speed of an airplane relative to the air through which it is passing while traveling at high velocities.

The need for an instrument to indicate true air speed has been early recognized. Among the first instruments was a diaphragm or bellows and Pitot tube. At higher speeds greater pressures were generated and it was impossible to calibrate a pressure responsive device to indicate true air speed due to the fact that air was a compressible medium and its density varied not only as a function of the speed but also in response to the altitude and the temperature of the air as well as with the barometric pressure.

In my co-pending application for a true air speed meter, Serial Number 640,915, filed January 12, 1946, now Patent 2,508,623, I show means for measuring true air speed in which an air pump is driven at a constant speed and balanced against the pressure generated in the Pitot tube. This means works well at lower and intermediate airplane speeds but at very high speeds a bulky pump is required and the problem of cooling the air compressed by the air pump becomes difficult.

One object of my invention is to provide a true air speed meter in which inaccuracies due to density differences are eliminated.

Another object of my invention is to provide a true air speed meter in which the instantaneous true air speed of an airplane will always be accurately indicated, thus enabling my device to be used with a computer without an averaging device.

Another object of my invention is to provide a true air speed meter in which the difficulties involved in measuring free air temperature are avoided.

Other and further objects of my invention will appear from the following description.

In general my invention contemplates an air speed meter employing a dynamic pressure balanced against a predetermined static pressure and a temperature measurement. The temperature measurement avoids the difficulty of measuring free air temperature by using the temperature at a point where the air is brought to rest as in the opening of a Pitot tube.

The accompanying drawing which forms part of the instant specification and is to be read in conjunction therewith shows a diagrammatic view of an air speed meter containing one embodiment of my invention.

Let:

$p$=pressure in the Pitot tube
$p_0$=static pressure
$T_0$=free air temperature
$T$=temperature of air brought to rest
$\gamma$=ratio of specific heat at constant pressure to specific heat at constant volume
$a$=speed of sound
$V$=true air speed
$R$=gas constant Now for true air speeds less than the speed of sound, the relations existing between pressures, temperatures and speeds may be expressed as follows:

(1) $$\frac{p}{p_0}=\left(1+\frac{\gamma-1}{2}\cdot\frac{V^2}{a^2}\right)^{\frac{\gamma}{\gamma-1}}$$

(2) $$\frac{T}{T_0}=\left(1+\frac{\gamma-1}{2}\cdot\frac{V^2}{a^2}\right)$$

(3) $$a^2=\gamma R T_0$$

Referring now to the drawing, a metallic bellows 2 communicates through conduit 4 with a Pitot static tube (not shown). A lever 6 fulcrumed about pivot 8 is connected at one end by rod 10 to the bellows 2 so that movement of the bellows will pivot the lever 6 about its fulcrum 8. A second bellows 12 is partially evacuated. It is connected by rod 14 to a second lever 16 which is fulcrumed about stationary pivot 18 in such a manner that movement of the bellows 12 in response to changes in altitude will pivot lever 16 about its fulcrum 18. A movable pin 20 is interposed between the ends of levers 6 and 16 in such a manner that downward thrust of the end of lever 16 is communicated to lever 6 and upward thrust of the end of lever 6 is communicated to the end of lever 16. The forces exerted by the two bellows may be balanced by moving the pin 20. If, for example, the Pitot pressure extending bellows 2 tending to move the right-hand end of lever 6 upwardly is greater than the barometric pressure of the surrounding atmosphere tending to move the left-hand end of lever 16 downwardly, a balance may be achieved by moving the pin 20 to the right decreasing the mechanical advantage of the lever 6 with respect to the lever 16.

The force exerted by bellows 2 is proportional to the pressure in the Pitot tube. The force exerted by bellows 12 is proportional to the barometric or static pressure. Equation 1 may be rewritten as follows:

(4) $$\frac{p-p_0}{p_0}=\left(1+\frac{\gamma-1}{2}\cdot\frac{V^2}{a^2}\right)^{\frac{\gamma}{\gamma-1}}-1=f\left(\frac{V^2}{a^2}\right)$$

The displacement of the balance pin 20 between the levers 16 and 6 is also proportional to the ratio of the bellows forces. Accordingly, letting the displacement of the balance pin 20 be represented by $d$ we may write:

(5)
$$d = f_1\left(\frac{V^2}{a^2}\right)$$

The exact form of $f_1$ will be determined by the bellows sizes and the dimensions of the levers 6 and 16.

Inasmuch as the temperature of the circumambient air through which the airplane is traveling is difficult to measure, I propose to measure the temperature of the air at a point where the air is brought to rest as, for example, in the opening of the Pitot tube. One means of measuring the temperature at this point is by the use of a platinum resistor element placed in an exposed position so that it will be responsive to the temperature of the compressed air at a point of rest in the Pitot tube.

The resistance of the platinum resistor at temperature T is:

$$R_T = R_0[1 + .00392(T-273)] = (.00392\,T - .0702)R_0$$

where $R_0$ is the resistance at 0° C. A fixed resistance of negligible temperature coefficient equal to $.0702\,R_0$ is added in series so that the total resistance (6) $\qquad R_1 = .00392\,R_0 T$ Combining Equations 2, 3 and 6 we obtain $$\frac{R_1}{.00392 R_0} \cdot \frac{\gamma R}{a^2} = 1 + \frac{\gamma-1}{2} \cdot \frac{V^2}{a^2}$$

Letting $$\frac{\gamma R}{.00392 R_0} = k_1$$

and $$\frac{\gamma-1}{2} = k_2$$

and multiplying both sides by $V^2$ we obtain (7) $\qquad k_1 \dfrac{V^2}{a^2} \cdot R_1 = V^2 \cdot \left(1 + k_2 \dfrac{V^2}{a^2}\right)$ Referring now to the drawing, I have shown a Wheatstone bridge in which the fixed resistor 22 has a value equal to $R_1$. The linear resistor 24 has a value proportional to $$k_1 \frac{V^2}{a^2}$$

the linear resistor 26 has a value proportional to $$1 + k_2 \frac{V^2}{a^2}$$

and the non-linear resistor 28 has a value proportional to $V^2$. The construction of the resistor 28 is such that movement of the variable arm 30 varies the resistance as the square of the movement so that the position of the arm 30 will vary as a function of the velocity; that is, the desired true air-speed.

The resistors chosen for the resistances 24, 26 and 28 have negligible temperature coefficients. The resistor 22 is of such construction that it has a comparatively large temperature coefficient.

A battery 32 is connected by a conductor 34 to the bridge between the resistors 24 and 26. The other terminal of the battery 32 is grounded at ground 36. A conductor 38 connected to the other terminal of the bridge between the resistors 28 and 22 is grounded at ground 40.

A contact point 42 is grounded by flexible conductor 44 to ground 46. An extension 48 rigidly carried by lever 16 for movement therewith supports the contact point 42.

One terminal of a battery 50 is connected by conductor 52 to respective ends of relay coils 54 and 56. The other terminal of the battery 50 is grounded at 58. When contact point 42 makes contact with contact plate 60, current will flow from the battery 50 through relay coil 54 to ground 46 and back to the battery 50. When this occurs relay armature 62 makes contact with contact point 64 so that current may flow from battery 50 through conductor 66 through the armature 68 of motor 67 through conductor 70 through armature 72 of the lower relay through conductor 74 to ground 76.

When contact point 42 makes contact with contact plate 78 current will flow from the battery 50 through the relay coil 56 to ground 46 and thence back to the battery. When this occurs, armature 72 will make contact with contact point 80 so that current will flow from the battery 50 through armature 72, through the conductor 70, through the armature 68 of the motor 67 in the opposite direction, returning through conductor 66, armature 62, ground 76 to the other side of the battery 50. A permanent magnet 82 furnishes the field for the motor 67. The motor shaft 84 is adapted to rotate a cam 86, which is shaped to displace a cam follower 88 in accordance with the Equation 5. The cam follower 88 is urged against the cam by means of a spring 90. The follower is carried by a slidable support 92 which carries the balance pin 20. A gear 94 is secured to the shaft 84 for movement therewith. The gear 94 meshes with the gear 96 which is secured to a shaft 98. The shaft 98 carries a pair of gears 100 and 102 meshing respectively with gears 104 and 106. Movement of gear 104 will move the variable arm 108 to alter the resistance of resistor 24. Movement of the gear 106 will rotate the arm 110 to vary the resistance of resistor 26.

One terminal of a battery 112 is connected by conductor 114 to respective ends of relay coils 116 and 118. The armature 120 of a polarized relay, indicated generally by the reference numeral 121, is adapted to make contact with contact point 122 or 124 depending upon the direction of the current flowing through control coil 126 which is connected by conductors 128 and 130 across the Wheatstone bridge. The armature 120 is grounded at 132. The other terminal of the battery 112 is grounded at 134. When the armature 120 of the polarized relay 121 makes contact with contact point 122, the relay coil 116 will be energized to move the relay armature 136 to make contact with contact point 138. Current will then flow from the battery 112 through the armature 136 through conductor 140 through the armature 142 of a motor, indicated generally by the reference numeral 141, through conductor 144, through the armature 146 of the other relay, through conductor 148 to the ground 150 and thence to the other terminal of the battery 112. A permanent magnet 152 supplies the field for the motor 141.

When the armature 120 makes contact with contact point 124, relay coil 118 is energized to cause armature 146 to make contact with contact point 154 permitting the current to flow from the battery through the armature of motor 142 in the opposite direction, thus reversing the direction of rotation of the motor. The motor shaft 156 carries gears 158 and 160 which mesh with gears 162 and 164. The gear 164 carries the variable arm 30 which controls the resistance of the resistor 28. The gear 162 is secured to a shaft 166 adapted to rotate a pointer 168 on a dial 170 of the air speed meter, indicated generally by the reference numeral 169.

In operation, referring to the drawing, let us assume that the airplane carrying my improved air speed meter increases its speed. The pressure within the Pitot tube carried by the airplane is increased and an increased pressure is thus communicated to the interior of tube 4 which communicates with the interior of bellows 2. The raised pressure tends to expand the bellows thus tending to rotate the lever 6 in a counterclockwise direction. This rotates the lever 16 in a clockwise direction and causes the contact point 42 to make contact with contact plate 78 energizing the winding 56 of the relay, indicated generally by the reference numeral 55. The energization of the winding 56 of the relay causes armature 72 to make contact with contact point 80 so that current now flows through conductor 70 to the upper brush of the motor indicated generally by the reference numeral 67. The polarity of the field of the motor 67 is such that the motor will run in a direction to rotate shaft 84 and hence cam 86 in a clockwise direction as viewed in the drawing. This permits the spring 90 to move the balance pin 20 to the right, thus reducing the mechanical advantage of lever 6 and increasing the mechanical advantage of the lever 16 until balance is again brought about. When this occurs contact is broken between contact point 42 and the contact plate 78 and the motor 68 stops. The rotation of the shaft 84, it will be observed by reference to Equation 4 above, is a function of $$\frac{V^2}{a^2}$$

The rotation of the cam in a clockwise direction will rotate the gear 96 and hence the shaft 98 in a clockwise direction viewed from above. This rotation is imparted to gears 100 and 102 which are carried for rotation with shaft 98. The rotation of gear 100 in a clockwise direction viewed from above will rotate gear 104 in a counterclockwise direction reducing the resistance 24. Similarly, the rotation of gear 102 in a clockwise direction viewed from above will rotate gear 106 meshing therewith in a counterclockwise direction reducing the value of the resistance 26. The reduction of resistances 24 and 26 will unbalance the bridge so that current will flow from the conductor 127 downwardly through the control coil 126 of the polarized relay through conductor 130 to the conductor 105. When this occurs, the armature 120 will make contact with contact point 124 so that current will now flow from the battery 112 through the control coil 118 of the lower relay thus attracting armature 146 to make contact with contact point 154. Current will then flow from the battery to the upper brush of the motor 141 through conductor 144. The polarity of the field is such that the motor will run in a counterclockwise direction viewed from the left, thus rotating the gear 160 in a counterclockwise direction viewed from the left. Gear 160 meshes with gear 164 so that this gear will rotate in a counterclockwise direction reducing the resistance 28. The resistance 28 is a non-linear resistance and is wound so that the resistance is reduced as a function of the square of the movement of the variable arm 30 actuated by gear 164. As soon as the resistance of resistor 28 moves sufficiently to balance the bridge, current no longer flows from conductor 127 to conductor 105 through the control coil 126 of the polarized relay 121. At this time the armature 120 breaks contact with contact point 124 deenergizing control coil 118 and permitting the spring (not shown) which biases armature 146 to move the armature 146 to the position shown in the drawing and stopping the motor 141. It will be clear that the rotation of shaft 156 is in accordance with a function of the true air speed. The gear 158 is mounted on shaft 156 for rotation therewith and meshes with gear 162. As pointed out above, an increase in air speed causes a rotation of the shaft 156 in a counterclockwise direction as viewed from the left. This rotation will produce a clockwise rotation of the gear 162 viewed from the bottom. The drawing is diagrammatic for purposes of clarity and the shaft 162 will rotate in a clockwise direction thus carrying the pointer 168 in a clockwise direction. The dial 170 of the air speed meter is calibrated to indicate true air speed.

A decrease in the velocity of the airplane will cause contact point 42 to make contact with contact plate 60 and the sequence of steps are analogous to those described but all take place in the opposite direction. The lower brush of motor 67 is then energized to rotate the cam 86 in a counterclockwise direction. The resistances of resistors 24 and 26 are increased and current will flow from conductor 105 to conductor 127 causing the energization of control winding 116 with oppositely flowing current so that the lower brush of motor 141 is connected with positive polarity causing the motor armature to rotate in a direction opposite from that described above, thus increasing the value of resistor 28 and causing the pointer 168 to indicate a lower air speed.

An increase in speed brings about a greater compression of the air in the Pitot tube, thus increasing the apparent temperature at this point, while the temperature of the circumambient air remains the same. The increase of the temperature causes an increase in the resistance of the resistor 22 which is designed to have an appreciable temperature coefficient. This increase in resistance of the resistor 22 reduces the extent to which the arm 30 must move in a counterclockwise direction upon an increase in velocity and serves to introduce the temperature correction by reducing the measurement of temperature of the air brought to rest to the temperature of the circumambient air. The evacuated bellows 12 automatically corrects for static air pressure which includes both the pressure variation from sea level atmospheric pressure due to altitude and the barometric pressure of the atmosphere at sea level. The resistor 35 in series with resistor 26 is a manually adjustable resistor which is provided for calibrating purposes.

It will be seen that I have accomplished the objects of my invention. I have provided a true air speed meter in which inaccuracies due to density differences are eliminated. My true air speed meter always accurately indicates true air speed thus enabling my device to be used with a computator without an averaging device. In my construction the difficulties involved in measuring free air temperature are avoided.

It will be understood that certain features and sub-combinations are of utility and may be employed without reference to other features and sub-combinations. This is contemplated by and is within the scope of my claims. It is further obvious that various changes may be made in details within the scope of my claims without departing from the spirit of my invention. It is therefore understood that my invention is not to be limited to the specific details shown and described.

Having thus described my invention, I claim:

1. A true air speed meter including in combination a Wheatstone bridge having a first impedance positioned in one arm of the bridge, differential pressure responsive means for varying the impedance as a function of the air speed of an airplane, means for varying the impedance as a function of the barometric pressure existing at the altitude at which the airplane is flying, a second impedance positioned in another arm of the bridge, means responsive to the unbalance of the bridge produced by said variations for altering the second impedance to bring the bridge back to balance and means responsive to a movement of said altering means for indicating the value of said second impedance as a measure of true air speed.

2. A true air speed meter as in claim 1 in which said bridge includes a third impedance positioned in a third arm of the bridge, said third impedance being such that it will vary as a function of the air temperature.

3. A true air speed meter as in claim 1 in which said bridge includes a third impedance positioned in a third arm of the bridge, said third impedance being such that it will vary as a function of the air temperature and being positioned at a point where the air through which the airplane is flying is brought to rest.

4. A true air speed meter including in combination a Wheatstone bridge having four variable resistances each positioned in a separate arm of the bridge, differential pressure responsive means for varying two of said resistances as a function of the air speed of an airplane, the third resistance being constructed to vary as a function of air temperature, means responsive to the unbalance of said bridge produced by the variation of said first three resistances for altering the resistance of said fourth resistance to bring the bridge back into balance, and means responsive to said altering means for indicating the value of said fourth resistance as the air speed to be measured.

5. A true air speed meter as in claim 4 including means to vary said first and second resistances as a function of the barometric pressure.

6. A true air speed meter as in claim 4 in which said temperature responsive resistance is positioned at a point where the air is brought to rest.

7. A true air speed meter as in claim 4 in which said means for altering said fourth resistance includes a polarized relay, control means for said relay connected across said bridge and means controlled by said relay for changing the value of said resistance in a direction determined by the direction of unbalance of said bridge.

8. A true air speed meter including in combination a first pressure responsive means communicating with a Pitot tube, a second pressure responsive means sensitive to changes in barometric pressure, means actuated by the first pressure responsive means, means actuated by the second pressure responsive means opposing the movement of the first actuated means, means for varying the mechanical advantage between the actuated means, means responsive to the movement of one of said actuated means for controlling the means for varying the mechanical advantage between the actuated means, a Wheatstone bridge having four arms, a resistor positioned in each arm of the bridge, means responsive to said means for varying the mechanical advantage between the actuated means for varying the resistance of two of said resistors, a third one of said resistors being formed of a metal having a large temperature coefficient whereby it is adapted to vary its resistance as a function of air temperature, means responsive to the unbalance of the bridge for varying the resistance of the fourth resistor and means for indicating the value of the resistance of said fourth resistor as the measure of air speed.

9. A true air speed meter as in claim 8 in which said third resistor is positioned at a point where the air is brought to rest.

10. A true air speed meter as in claim 8 in which said means responsive to the unbalance of the bridge for varying the resistance of said fourth resistor includes a polarized relay, control means for said relay connected across said bridge and means controlled by said relay for varying the resistance of said fourth resistor as the square of the movement of said varying means.

CARL F. SCHAEFER.

REFERENCES CITED

The following references are of record in the file of this patent:

UNITED STATES PATENTS

| Number | Name | Date |
| --- | --- | --- |
| 1,573,850 | Naiman | Feb. 23, 1926 |
| 2,318,153 | Gilson | May 4, 1943 |

FOREIGN PATENTS

| Number | Country | Date |
| --- | --- | --- |
| 435,142 | Great Britain | June 15, 1936 |
| 517,321 | Great Britain | Jan. 26, 1940 |
| 575,008 | Great Britain | Jan. 30, 1946 |

OTHER REFERENCES

N. A. C. A. Wartime Report L-423 entitled N. A. C. A. Mach Number Indicator for Use in High Speed Tunnels, by Norman F. Smith. Issued July 1943 as Advanced Confidential Report 3G31, Declassified, May 1947.